United States Patent
Yang et al.

(10) Patent No.: US 11,902,980 B2
(45) Date of Patent: Feb. 13, 2024

(54) METHOD AND DEVICE FOR TRANSMITTING/RECEIVING WIRELESS SIGNAL IN WIRELESS COMMUNICATION SYSTEM

(71) Applicant: LG ELECTRONICS INC., Seoul (KR)

(72) Inventors: Suckchel Yang, Seoul (KR); Hanjun Park, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 335 days.

(21) Appl. No.: 17/267,475

(22) PCT Filed: Aug. 7, 2019

(86) PCT No.: PCT/KR2019/009842
§ 371 (c)(1),
(2) Date: Feb. 9, 2021

(87) PCT Pub. No.: WO2020/032558
PCT Pub. Date: Feb. 13, 2020

(65) Prior Publication Data
US 2021/0329676 A1    Oct. 21, 2021

Related U.S. Application Data

(60) Provisional application No. 62/716,909, filed on Aug. 9, 2018.

(51) Int. Cl.
*H04W 72/21* (2023.01)
*H04L 5/00* (2006.01)
(Continued)

(52) U.S. Cl.
CPC ........... *H04W 72/21* (2023.01); *H04L 5/0055* (2013.01); *H04W 4/44* (2018.02); *H04W 4/46* (2018.02);
(Continued)

(58) Field of Classification Search
CPC ......... H04W 72/21; H04W 4/46; H04W 4/44; H04W 16/14; H04W 74/0808; H04L 5/0055
See application file for complete search history.

(56) References Cited

U.S. PATENT DOCUMENTS

2018/0160436 A1    6/2018  Park et al.
2018/0270860 A1*   9/2018  Bhorkar .............. H04W 74/006
(Continued)

FOREIGN PATENT DOCUMENTS

KR    1020180039501    4/2018
WO    2017047973       3/2017
(Continued)

OTHER PUBLICATIONS

PCT International Application No. PCT/KR2019/009842, International Search Report dated Nov. 21, 2019, 18 pages.

(Continued)

*Primary Examiner* — Michael J Moore, Jr.
(74) *Attorney, Agent, or Firm* — LEE, HONG, DEGERMAN, KANG & WAIMEY

(57) ABSTRACT

The present invention relates to a wireless communication system, and specifically, to a method and a device for the method, the method comprising the steps of: receiving scheduling information including LBT type information and PUCCH resource indication information; receiving data on the basis of the scheduling information; and carrying out an LBT procedure on the basis of the LBT type information, and then transmitting ACK/NACK information of the data (Continued)

by using a PUCCH resource, wherein one PUCCH resource set, among a plurality of PUCCH resource sets, is selected on the basis of the value of the LBT type information, and the PUCCH resource is indicated, in the selected PUCCH resource set, by the PUCCH resource indication information.

15 Claims, 17 Drawing Sheets

(51) Int. Cl.
| | |
|---|---|
| *H04W 4/46* | (2018.01) |
| *H04W 4/44* | (2018.01) |
| *H04W 16/14* | (2009.01) |
| *H04W 74/08* | (2009.01) |

(52) U.S. Cl.
CPC ....... *H04W 16/14* (2013.01); *H04W 74/0808* (2013.01)

(56) References Cited

U.S. PATENT DOCUMENTS

| | | | | |
|---|---|---|---|---|
| 2019/0104416 A1* | 4/2019 | Yerramalli | ............ | H04W 72/20 |
| 2019/0132883 A1* | 5/2019 | You | ............ | H04L 1/1812 |
| 2019/0150196 A1* | 5/2019 | Koorapaty | ............ | H04L 1/1812 370/329 |
| 2019/0253200 A1* | 8/2019 | Salem | ............ | H04W 72/23 |
| 2019/0268971 A1* | 8/2019 | Talarico | ............ | H04W 76/27 |
| 2019/0306923 A1* | 10/2019 | Xiong | ............ | H04J 13/0062 |
| 2021/0092769 A1* | 3/2021 | Koorapaty | ............ | H04W 74/006 |
| 2021/0320761 A1* | 10/2021 | Yang | ............ | H04L 1/1887 |
| 2021/0321445 A1* | 10/2021 | Yang | ............ | H04W 76/28 |
| 2021/0328728 A1* | 10/2021 | El Hamss | ............ | H04L 5/0091 |
| 2021/0329676 A1* | 10/2021 | Yang | ............ | H04W 74/0808 |
| 2021/0391906 A1* | 12/2021 | Oteri | ............ | H04L 5/0048 |

FOREIGN PATENT DOCUMENTS

| | | | | |
|---|---|---|---|---|
| WO | WO-2017118627 A1 * | 7/2017 | ............ | H04L 1/1812 |
| WO | 2018029659 | 2/2018 | | |

OTHER PUBLICATIONS

ZTE, et al., "Considerations on RS/channel design and measurement for NR-U," 3GPP TSG RAN WG1 Meeting #92bis, R1-1803951, Apr. 2018, 10 pages.

* cited by examiner (a) Carrier aggregation between L-band and U-band (b) standalone U-band(s)

METHOD AND DEVICE FOR TRANSMITTING/RECEIVING WIRELESS SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2019/009842, filed on Aug. 7, 2019, which claims the benefit of U.S. Provisional Application No. 62/716,909, filed on Aug. 9, 2018, the contents of which is hereby incorporated by reference herein in its entirety.

TECHNICAL FIELD

The present disclosure relates to a wireless communication system, and more particularly, to a method and apparatus for transmitting/receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present disclosure is to provide a method of efficiently transmitting/receiving control information in a wireless communication and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method of transmitting a signal by a communication device in a wireless communication system is provided. The method may include: receiving scheduling information including listen-before-talk (LBT) type information and physical uplink control channel (PUCCH) resource indication information; receiving data based on the scheduling information; and transmitting acknowledgement/negative-acknowledgement (ACK/NACK) information for the data after performing an LBT procedure based on the LBT type information. One PUCCH resource set may be selected from among a plurality of PUCCH resource sets based on a value of the LBT type information, and a PUCCH resource may be indicated by the PUCCH resource indication information within the selected PUCCH resource set.

In another aspect of the present disclosure, a communication device for use in a wireless communication system is provided. The communication device may include a memory and a processor. The processor may be configured to: receive scheduling information including LBT type information and PUCCH resource indication information; receive data based on the scheduling information; and transmit ACK/NACK information for the data on a PUCCH resource after performing an LBT procedure based on the LBT type information. One PUCCH resource set may be selected from among a plurality of PUCCH resource sets based on a value of the LBT type information, and the PUCCH resource may be indicated by the PUCCH resource indication information within the selected PUCCH resource set.

Preferably, the plurality of PUCCH resource sets may be configured by a higher layer signal, and each PUCCH resource set may be related to each LBT type and include a plurality of PUCCH resources.

Preferably, when the value of the LBT type information indicates a first LBT type, the PUCCH resource may be indicated by the PUCCH resource indication information within a first PUCCH resource set. When the value of the LBT type information indicates a second LBT type, the PUCCH resource may be indicated by the PUCCH resource indication information within a second PUCCH resource set. The first PUCCH resource set may be different from the second PUCCH resource set.

Preferably, the first LBT type may be an LBT type in which back-off is not performed, and the second LBT type may be an LBT type in which the back-off is performed.

Preferably, the ACK/NACK information may be transmitted on an unlicensed cell (UCell).

Preferably, the LBT may include a channel access procedure (CAP).

Preferably, the wireless communication system may include a 3rd Generation Partnership Project-based (3GPP-based) wireless communication system.

Preferably, the communication device may include an autonomous driving vehicle configured to communicate at least with a terminal, a network, and other autonomous driving vehicles other than the communication device.

Advantageous Effects

According to the present disclosure, wireless signal transmission and reception may be efficiently performed in a wireless communication system.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
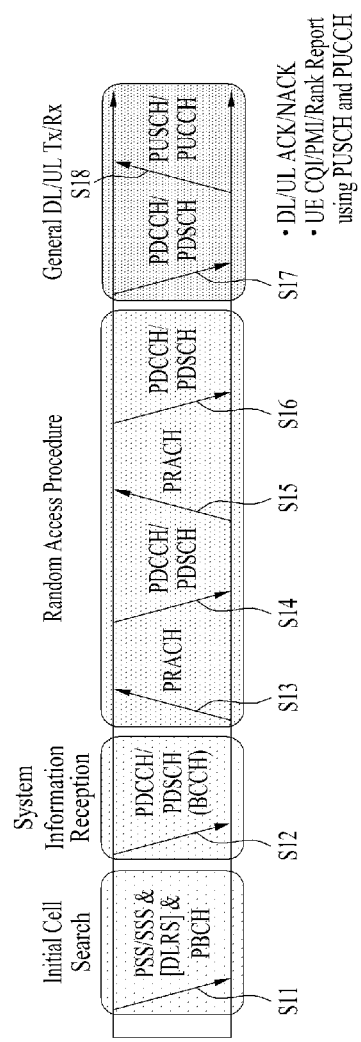
FIG. 1 illustrates physical channels used in a 3rd generation partnership project (3GPP) system, which is an example of wireless communication systems, and a general signal transmission method using the same.

FIG. 1 illustrates physical channels used in a 3GPP NR system and a general signal transmission method using the same.

When a UE is powered on or enters a new cell, the UE performs initial cell search in step S101. The initial cell search involves synchronization with a BS. To this end, the UE receives a synchronization signal block (SSB) from the BS. The SSB includes a primary synchronization signal (PSS), a secondary synchronization signal (SSS), and a physical broadcast channel (PBCH). The UE synchronizes to the BS and obtain information such as a cell identifier (ID) based on the PSS/SSS. In addition, the UE may obtain information broadcast in a cell based on the PBCH. During the initial cell search, the UE may also monitor a DL channel state by receiving a downlink reference signal (DL RS).

After the initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUS CH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
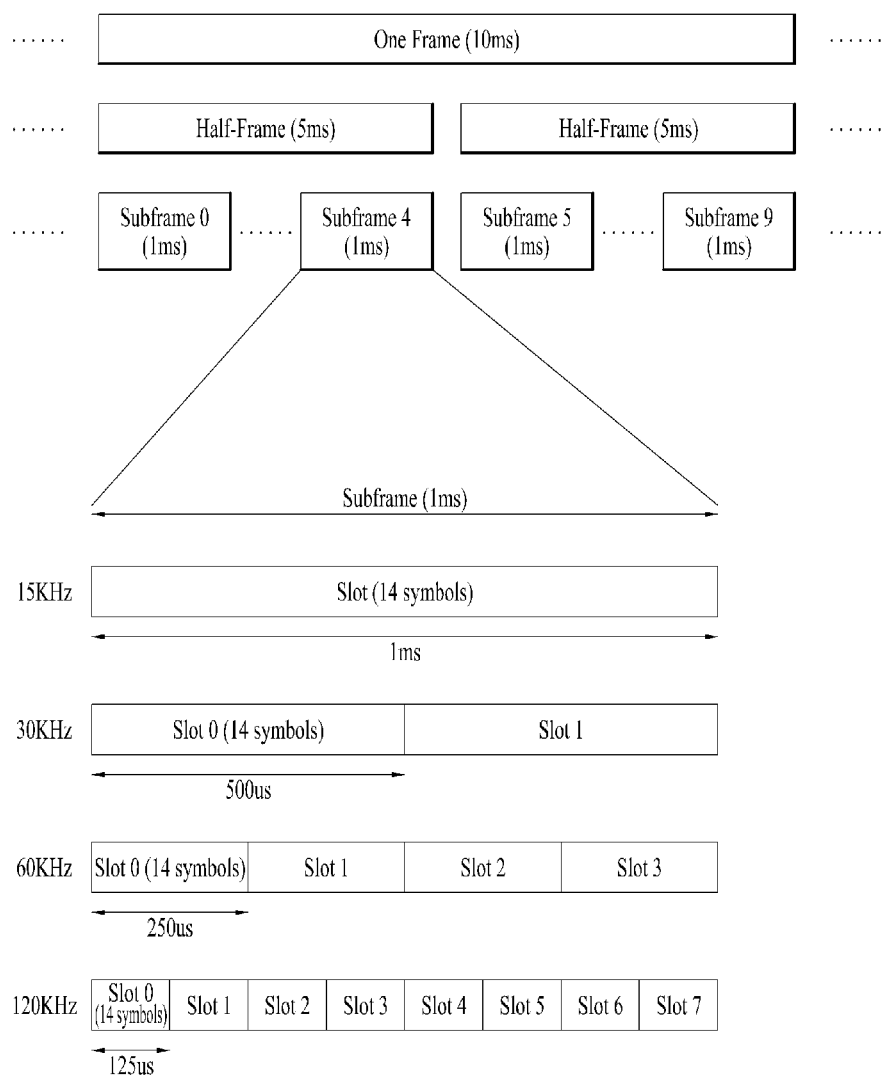
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14

Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame,u}_{slot}$: Number of slots in a frame
*$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a Discrete Fourier Transform-spread-OFDM (DFT-s-OFDM) symbol).

Figure 3:
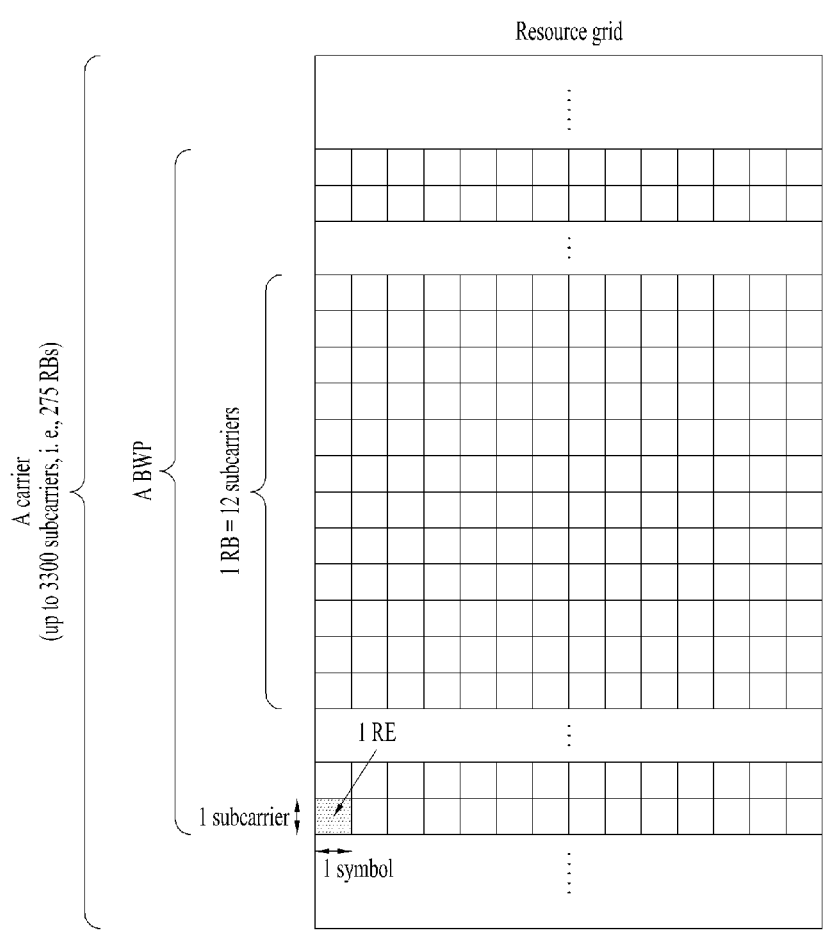
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
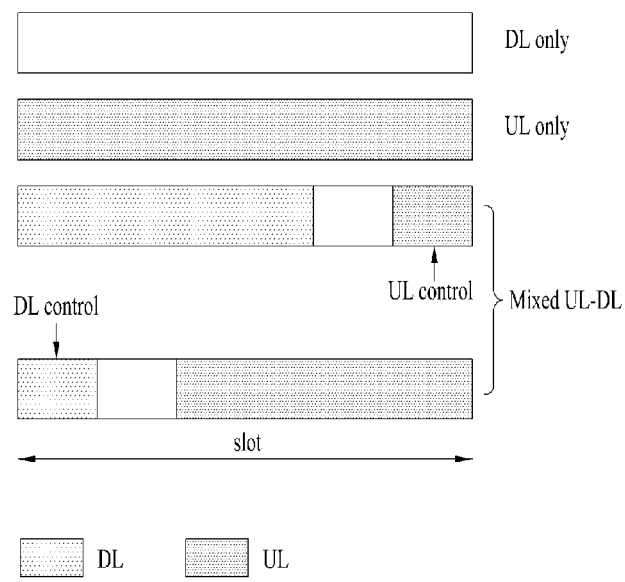
FIG. 4 illustrates a structure of a self-contained slot.

FIG. 4 illustrates a structure of a self-contained slot. In the NR system, a frame has a self-contained structure in which a DL control channel, DL or UL data, a UL control channel, and the like may all be included in one slot. For example, the first N symbols (hereinafter referred to as a DL control region) in a slot may be used to transmit a DL control channel, and the last M symbols (hereinafter referred to as a UL control region) in the slot may be used to transmit a UL control channel. N and M are integers greater than 0. A resource region between the DL control region and the UL control region (hereinafter referred to as a data region) may be used for DL data transmission or UL data transmission. There may be a time gap for DL-to-UL or UL-to-DL switching between the control region and the data region. For example, the following configurations may be considered. Corresponding intervals are listed in temporal order.

1. DL only configuration
2. UL only configuration
3. Mixed UL-DL configuration
  DL region+Guard Period (GP)+UL control region;
  DL control region+GP+UL region,
  DL region: (i) DL data region or (ii) DL control region+ DL data region;
  UL region: (i) UL data region or (ii) UL data region+UL control region.

Figure 5:
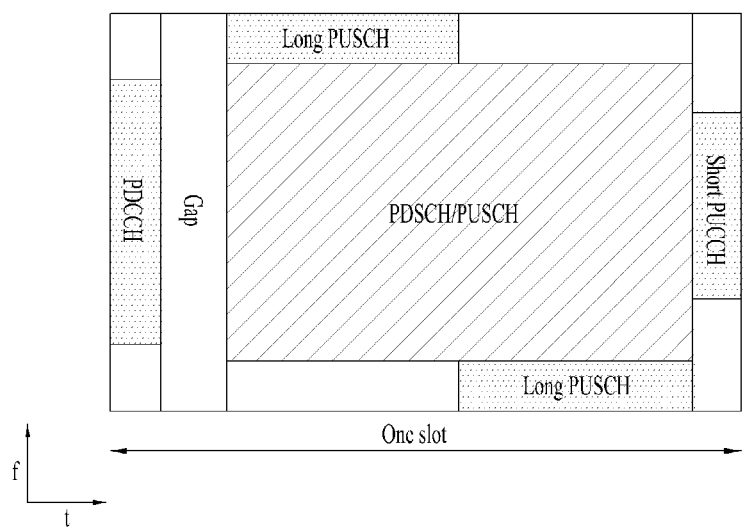
FIG. 5 illustrates an example in which a physical channel is mapped to a self-contained slot.

FIG. 5 illustrates an example in which a physical channel is mapped into a self-contained slot. A PDCCH may be transmitted in the DL control region, and a PDSCH may be transmitted in the DL data region. A PUCCH may be transmitted in the UL control region, and a PUSCH may be transmitted in the UL data region. The GP provides a time gap in the process of switching from the transmission mode to the reception mode or from the reception mode to the transmission mode. Some symbols at the time of switching from DL to UL within a subframe may be configured as the GP.

Hereinafter, each of the physical channels will be described in more detail.

The PDCCH carries Downlink Control Information (DCI). For example, the PCCCH (i.e., DCI) carries a transmission format and resource allocation of a downlink shared channel (DL-SCH), resource allocation information about an uplink shared channel (UL-SCH), paging information about a paging channel (PCH), system information present on the DL-SCH, resource allocation information about a higher layer control message such as a random access response transmitted on a PDSCH, a transmit power control command, and activation/release of configured scheduling (CS). The DCI includes a cyclic redundancy check (CRC). The CRC is masked/scrambled with different identifiers (e.g., Radio Network Temporary Identifier (RNTI)) according to the owner or usage of the PDCCH. For example, if the PDCCH is for a specific UE, the CRC will be masked with a UE identifier (e.g., Cell-RNTI (C-RNTI)). If the PDCCH is for paging, the CRC will be masked with a Paging-RNTI (P-RNTI). If the PDCCH is for system information (e.g., a system information block (SIB)), the CRC will be masked with a system information RNTI (SI-RNTI). If the PDCCH is for a random access response, the CRC will be masked with a random access-RNTI (RA-RNTI).

The PDCCH consists of 1, 2, 4, 8, or 16 Control Channel Elements (CCEs) depending on an aggregation level (AL). The CCE is a logical allocation unit used to provide a PDCCH having a predetermined code rate according to a radio channel state. A CCE consists of 6 Resource Element Groups (REGs). An REG is defined by one OFDM symbol and one (P)RB. The PDCCH is transmitted through a Control Resource Set (CORESET). The CORESET is defined as an REG set having a given numerology (e.g., SCS, CP length). A plurality of CORESETs for one UE may overlap with each other in the time/frequency domain. A CORESET may be configured through system information (e.g., a Master Information Block (MIB)) or UE-specific higher layer (e.g. Radio Resource Control (RRC) layer) signaling. Specifically, the number of RBs and the number of OFDM symbols (a maximum of 3 OFDM symbols) that constitute the CORESET may be configured by higher layer signaling.

To receive/detect a PDCCH, the UE monitors PDCCH candidates. The PDCCH candidates represent the CCE(s) that the UE should monitor for PDCCH detection. Each PDCCH candidate is defined as 1, 2, 4, 8, or 16 CCEs depending on the AL. The monitoring includes (blind) decoding of the PDCCH candidates. A set of PDCCH candidates monitored by the UE is defined as a PDCCH Search Space (SS). The SS includes a common search space (CSS) or a UE-specific search space (USS). The UE may acquire DCI by monitoring the PDCCH candidates in one or more SSs configured by the MIB or higher layer signaling. Each CORESET is associated with one or more SSs, and each of the SSs is associated with one COREST. The SSs may be defined based on the following parameters.

controlResourceSetId: Indicates a CORESET associated with an SS;

monitoringSlotPeriodicityAndOffset: Indicates a PDCCH monitoring periodicity (in units of slots) and a PDCCH monitoring interval offset (in units of slots);

monitoringSymbolsWithinSlot: Indicates PDCCH monitoring symbols in a slot (e.g. the first symbol(s) of the CORESET);

nrofCandidates: Indicates the number of PDCCH candidates (one of 0, 1, 2, 3, 4, 5, 6, and 8) for each AL={1, 2, 4, 8, 16}.

An occasion (e.g., time/frequency resources) in which PDCCH candidates should be monitored is defined as a PDCCH (monitoring) occasion. One or more PDCCH (monitoring) occasions may be configured in a slot.

Table 3 exemplarily shows the features of the respective search space types.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 exemplarily shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |

TABLE 4-continued

| DCI format | Usage |
|---|---|
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used for scheduling of a TB-based (or TB-level) PUSCH, and DCI format 0_1 may be used for scheduling of a TB-based (or TB-level) PUSCH or a Code Block Group (CBG)-based (or CBG-level) PUSCH. DCI format 1_0 may be used for scheduling of a TB-based (or TB-level) PDSCH, and DCI format 1_1 may be used for scheduling of a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 is used to deliver dynamic slot format information (e.g., dynamic SFI) to the UE, and DCI format 2_1 is used to deliver downlink pre-emption information to the UE. DCI format 2_0 and/or DCI format 2_1 may be delivered to UEs in a group on a group common PDCCH, which is a PDCCH delivered to UEs defined as one group.

DCI format 0_0 and DCI format 1_0 may be referred to as fallback DCI formats, and DCI format 0_1 and DCI format 1_1 may be referred to as non-fallback DCI formats. For the fallback DCI formats, the same DCI size/field configuration is maintained regardless of the UE configuration. On the other hand, for the non-fallback DCI formats, the DCI size/field configuration varies according to the UE configuration.

The PDSCH carries downlink data (e.g., DL-SCH transport block (DL-SCH TB)), and a modulation technique such as Quadrature Phase Shift Keying (QPSK), 16 Quadrature Amplitude Modulation (QAM), 64 QAM, or 256 QAM is applied thereto. The TB is encoded to generate a codeword. The PDSCH may carry a maximum of two codewords. Scrambling and modulation mapping may be performed on each codeword, and the modulation symbols generated from each codeword may be mapped to one or more layers. Each of the layers is mapped to a resource together with a Demodulation Reference Signal (DMRS) to generate an OFDM symbol signal and transmit the signal through a corresponding antenna port.

The PUCCH carries Uplink Control Information (UCI). The UCI includes the following information.

Scheduling Request (SR): Information that is used to request a UL-SCH resource.

Hybrid Automatic Repeat Request (HARQ)-Acknowledgment (ACK): A response to a downlink data packet (e.g., codeword) on the PDSCH. HARQ-ACK indicates whether the downlink data packet has been successfully received. In response to a single codeword, one bit of HARQ-ACK may be transmitted. In response to two codewords, two bits of HARQ-ACK may be transmitted. The HARQ-ACK response includes positive ACK (simply, ACK), negative ACK (NACK), DTX or NACK/DTX. Here, the HARQ-ACK is used interchangeably used with HARQ ACK/NACK and ACK/NACK.

Channel State Information (CSI): Feedback information about a downlink channel. Multiple Input Multiple Output (MIMO)-related feedback information includes a Rank Indicator (RI) and a Precoding Matrix Indicator (PMI).

Table 5 exemplarily shows PUCCH formats. PUCCH formats may be divided into Short PUCCHs (Formats 0 and 2) and Long PUCCHs (Formats 1, 3, and 4) based on the PUCCH transmission duration.

TABLE 5

| PUCCH format | Length in OFDM symbols $N^{PUCCH}_{symb}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI having a size of up to 2 bits, and is mapped based on a sequence and transmitted. Specifically, a UE transmits one of a plurality of sequences on a PUCCH corresponding to PUCCH format 0 to transmit specific UCI to the eNB. Only when transmitting a positive SR, the UE transmits a PUCCH corresponding to PUCCH format 0 within a PUCCH resource for the corresponding SR configuration.

PUCCH format 1 carries UCI having a size of up to 2 bits, and the modulation symbols therefor are spread by an orthogonal cover code (OCC) (configured differently depending on whether frequency hopping is performed) in the time domain. The DMRS is transmitted on a symbol on which a modulation symbol is not transmitted (namely, the DMRS is transmitted through time division multiplexing (TDM)).

PUCCH format 2 carries UCI having a bit size larger than 2 bits, and the modulation symbols are transmitted through frequency division multiplexing (FDM) with the DMRS. The DM-RS is positioned on symbol indexes #1, #4, #7 and #10 in a resource block given with a density of ⅓. A Pseudo Noise (PN) sequence is used for the DM RS sequence. For two-symbol PUCCH format 2, frequency hopping may be enabled.

PUCCH format 3 is not subjected to UE multiplexing in the same physical resource block, but carries UCI having a bit size larger than 2 bits. In other words, the PUCCH resource of PUCCH format 3 does not include an OCC. The modulation symbols are transmitted through time division multiplexing (TDM) with the DMRS.

PUCCH format 4 supports multiplexing with up to 4 UEs in the same physical resource blocks and carries UCI having a bit size larger than 2 bits. In other words, the PUCCH resource of PUCCH format 3 includes an OCC. The modulation symbols are transmitted through time division multiplexing (TDM) with the DMRS.

The PUSCH carries uplink data (e.g., UL-SCH transport block (UL-SCH TB)) and/or uplink control information (UCI), and is transmitted based on a Cyclic Prefix-Orthogonal Frequency Division Multiplexing (CP-OFDM) waveform or a Discrete Fourier Transform-spread-Orthogonal Frequency Division Multiplexing (DFT-s-OFDM) waveform. When the PUSCH is transmitted based on the DFT-s-OFDM waveform, the UE applies transform precoding to transmit the PUSCH. For example, when the transform precoding is not allowed (e.g., the transform precoding is disabled), the UE may transmit the PUSCH based on the CP-OFDM waveform. When the transform precoding is allowed (e.g., the transform precoding is enabled), the UE may transmit the PUSCH based on the CD-OFDM waveform or the DFT-s-OFDM waveform. PUSCH transmission may be dynamically scheduled by the UL grant in the DCI or semi-statically scheduled based on higher layer (e.g., RRC) signaling (and/or Layer 1 (L1) signaling (e.g., PDCCH)) (configured grant). The PUSCH transmission may be performed on a codebook basis or on a non-codebook basis.

Figure 6:
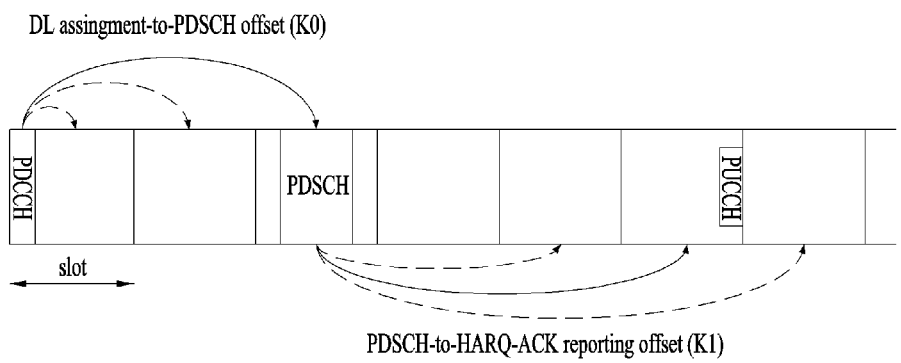
FIG. 6 illustrates an acknowledgement/negative acknowledgement (ACK/NACK) transmission procedure.

FIG. 6 illustrates an ACK/NACK transmission procedure. Referring to FIG. 6, the UE may detect a PDCCH in slot #n. Here, the PDCCH includes downlink scheduling information (e.g., DCI format 1_0 or 1_1). The PDCCH indicates a DL assignment-to-PDSCH offset (K0) and a PDSCH-HARQ-ACK reporting offset (K1). For example, DCI format 1_0 or 1_1 may include the following information.

Frequency domain resource assignment: Indicates an RB set assigned to the PDSCH.

Time domain resource assignment: Indicates K0 and the starting position (e.g. OFDM symbol index) and duration (e.g. the number of OFDM symbols) of the PDSCH in a slot.

PDSCH-to-HARQ_feedback timing indicator: Indicates K1.

After receiving the PDSCH in slot #(n+K0) according to the scheduling information of slot #n, the UE may transmit UCI on the PUCCH in slot #(n+K1). Here, the UCI includes a HARQ-ACK response to the PDSCH. In the case where the PDSCH is configured to transmit a maximum of one TB, the HARQ-ACK response may be configured in one bit. In the case where the PDSCH is configured to transmit a maximum of two TBs, the HARQ-ACK response may be configured in two bits if spatial bundling is not configured and may be configured in one bit if spatial bundling is configured. When slot #(n+K1) is designated as a HARQ-ACK transmission time for a plurality of PDSCHs, the UCI transmitted in slot #(n+K1) includes a HARQ-ACK response to the plurality of PDSCHs.

Figure 7:
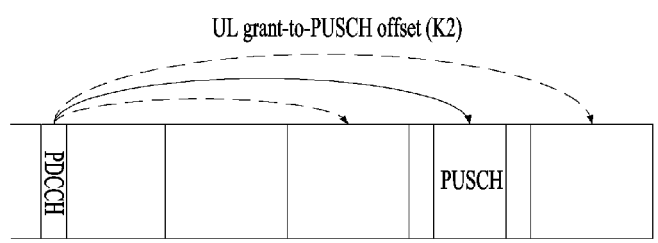
FIG. 7 illustrates an exemplary physical uplink shared channel (PUSCH) transmission procedure.

FIG. 7 illustrates an exemplary PUSCH transmission procedure. Referring to FIG. 7, a UE may detect a PDCCH in slot #n. The PDCCH may include UL scheduling information (e.g., DCI format 0_0, DCI format 0_1). DCI format 0_0 and DCI format 0_1 may include the following information.

Frequency domain resource assignment: this indicates an RB set allocated to a PUSCH.

Time domain resource assignment: this specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit the PUSCH in slot #(n+K2) according to the scheduling information in slot #n. The PUSCH includes a UL-SCH TB.

Figure 8:
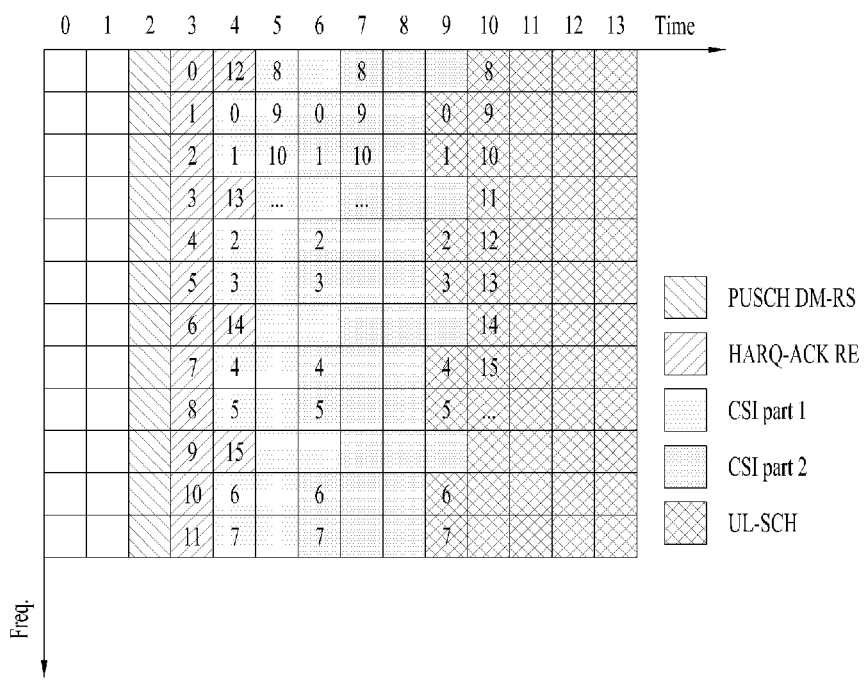
FIG. 8 illustrates exemplary multiplexing control information in a PUSCH.

FIG. 8 illustrates exemplary multiplexing of UCI in a PUSCH. If a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 8, an HARQ-ACK and CSI are carried in a PUSCH resource.

Embodiment: Uplink Transmission in U-Band

Recently, the 3GPP standardization group has proceeded to standardize a 5G wireless communication system named new RAT (NR). The 3GPP NR system has been designed to support a plurality of logical networks in a single physical system and provide services with various requirements (e.g., eMBB, mMTC, URLLC, etc.) by changing a transmission time interval (TTI) and/or an OFDM numerology (e.g., OFDM symbol duration, SCS, etc.). In recent years, data traffic has significantly increased with the advent of smart devices. Thus, the 3GPP NR system has also considered use of an unlicensed band for cellular communication as in License-Assisted Access (LAA) of the legacy 3GPP LTE system. However, unlike the LAA, a NR cell in the unlicensed-band (NR UCell) aims to support standalone (SA) operation. For example, PUCCH and/or PUSCH transmission may be supported in the NR UCell.

Figure 9:
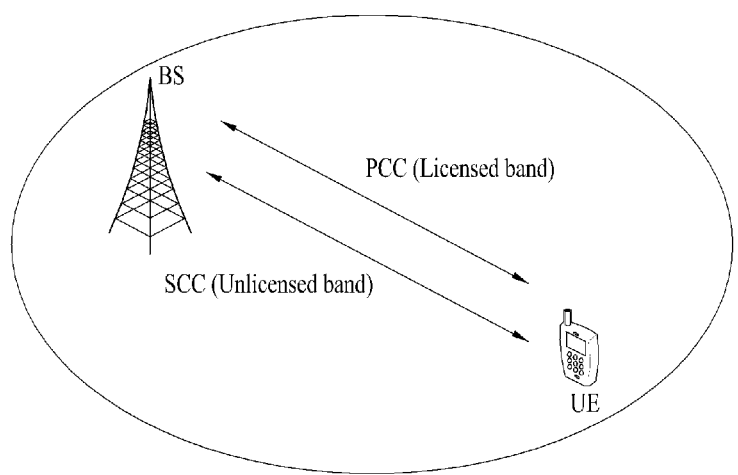
FIG. 9 illustrates a wireless communication system supporting an unlicensed band.
Figure 9:
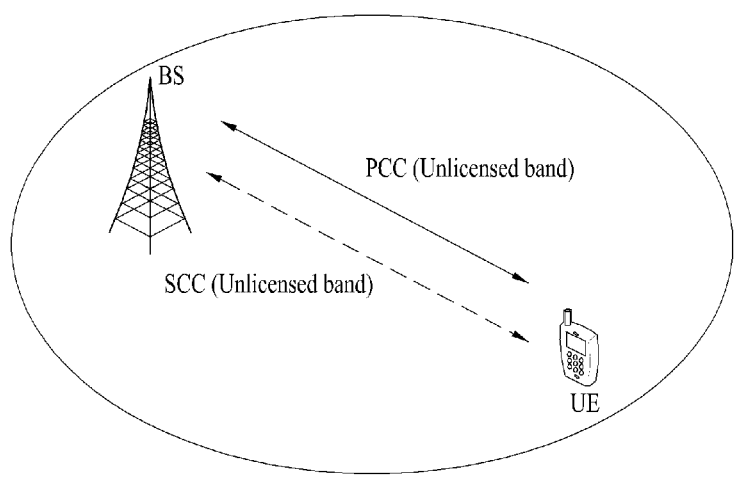

FIG. 9 illustrates a wireless communication system supporting an unlicensed band. Herein, a cell operating in a licensed band (L-band) is defined as an LCell, and a carrier of the LCell is defined as a (DL/UL) LCC. A cell operating in an unlicensed band (U-band) is defined as a UCell, and a carrier of the UCell is defined as a (DL/UL) UCC. Here, the carrier of the cell may refer to the operating frequency (e.g., center frequency) of the cell. A cell/carrier (e.g., CC) is commonly called a cell.

When carrier aggregation is supported, one UE may use a plurality of aggregated cells/carriers to exchange a signal with the BS. When one UE is configured with a plurality of CCs, one CC may be set to a primary CC (PCC), and the remaining CCs may be set to secondary CCs (SCCs). Specific control information/channels (e.g., CSS, PDCCH, PUCCH, etc.) may be transmitted and received only on the PCC. Data may be transmitted and received on the PCC/SCC. FIG. 9 (*a*) shows a case in which the UE and BS exchange signals on both the LCC and UCC (non-standalone (NSA) mode). In this case, the LCC and UCC may be set to the PCC and SCC, respectively. When the UE is configured with a plurality of LCCs, one specific LCC may be set to the PCC, and the remaining LCCs may be set to the SCC. FIG. 9 (*a*) corresponds to the LAA of the 3GPP LTE system. FIG. 9 (*b*) shows a case in which the UE and BS exchange signals on one or more UCCs with no LCC (SA mode). In this case, one of the UCCs may be set to the PCC, and the remaining UCCs may be set to the SCC. Both the NSA mode and SA mode may be supported in the U-band of the 3GPP NR system.

Figure 10:
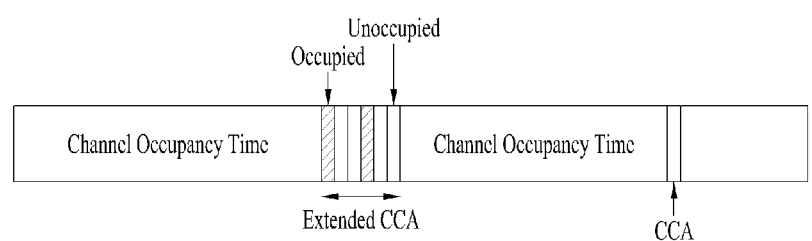
FIG. 10 illustrates resource occupancy in an unlicensed band.

FIG. 10 illustrates resource occupancy in the U-band. According to regional regulations for U-bands, a communication node in the U-band needs to determine whether a channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), the communication node may determine that the channel is busy if the detected channel energy is higher than the CCA threshold. Otherwise, the communication node may determine that the channel is idle. The Wi-Fi standard (802.11ac) specifies a CCA threshold of −62 dBm for non-Wi-Fi signals and a CCA threshold of −82 dBm for Wi-Fi signals. When it is determined that the channel is idle, the communication node may start the signal transmission in the UCell. The sires of processes described above may be referred to as Listen-Before-Talk (LBT) or a channel access procedure (CAP). The LBT may be interchangeably used with the CAP.

In Europe, two LBT operations named Frame Based Equipment (FBE) and Load Based Equipment (LBE) have been defined. In FBE, one fixed frame includes a channel occupancy time (e.g., 1 to 10 ms), which is a time period in which a communication node can maintain transmission when channel access is successful, and an idle period, which is at least 5% of the channel occupancy time. The CCA is defined as an operation of monitoring a channel for a CCA slot (at least 20 μs) at the end of the idle period. The communication node periodically performs the CCA on a fixed frame basis. If the channel is unoccupied, the communication node transmits data within the channel occupancy time. If the channel is occupied, the communication node defers the transmission and waits until the CCA slot of the next period.

In LBE, the communication node first sets the value of q from q∈{4, 5, ..., 32} and then performs the CCA for one CCA slot. If the channel is unoccupied in a first CCA slot, the communication node may transmit data by securing a time period of up to (13/32)q ms. If the channel is occupied in the first CCA slot, the communication node randomly selects the value of N from N∈{1, 2, ..., q} and stores the selected value as the initial value of a counter. Then, the communication node senses the state of the channel on a CCA slot basis. If the channel is unoccupied in each CCA slot, the communication node decreases the count value by 1. If the count value is 0, the communication node may transmit data by securing a time period of up to (13/32)q ms.

Specifically, a plurality of CAP types (LBT types) may be defined for UL transmission in the U-band. For example, a Type 1 or Type 2 CAP may be defined for the UL transmission. The UE may perform a CAP configured/indicated by the BS (e.g., Type 1 or Type 2 CAP) for the UL signal transmission.

(1) Type 1 UL CAP Method

Figure 11:
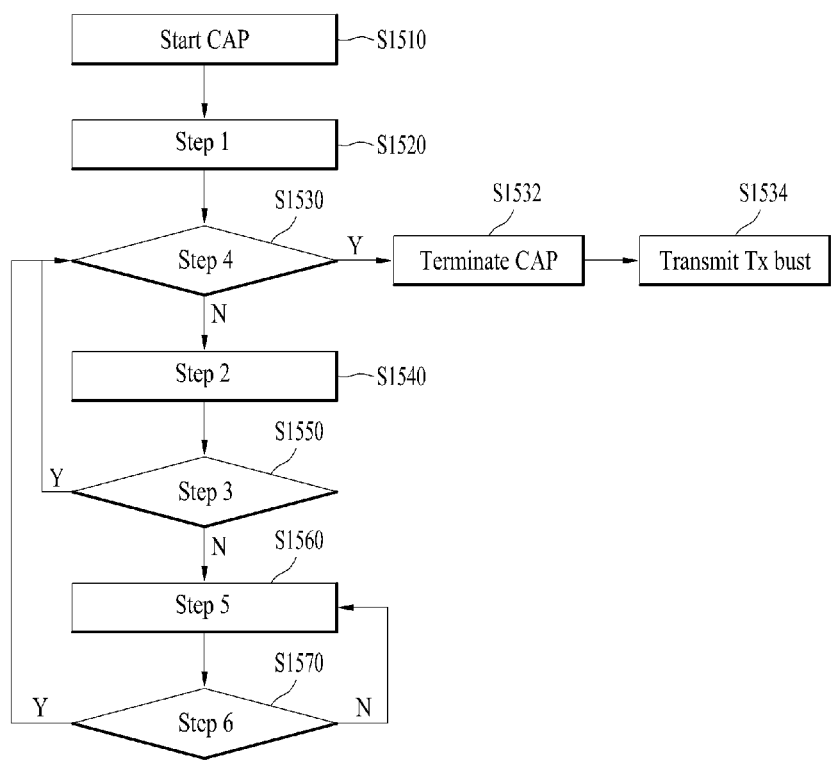
FIG. 11 is a flowchart illustrating Type 1 channel access procedure (CAP) operations of a user equipment (UE) for uplink signal transmission.

FIG. 11 is a flowchart illustrating Type 1 CAP operations of a UE for UL signal transmission.

To transmit a signal in the U-band, the UE may initiate a CAP (S1510). The UE may randomly select a backoff counter value N within a contention window (CW) according to step 1. In this case, N is set to an initial value $N_{init}$ (S1520). $N_{init}$ may have a random value between 0 and $CW_p$. If it is determined according to step 4 that the backoff counter value N is 0 (YES in S1530), the UE terminates the CAP (S1532). Then, the UE may perform Tx burst transmission (S1534). If the backoff counter value is non-zero (NO in v), the UE decreases the backoff counter value by 1 according to step 2 (S1540). The UE checks whether the channel of UCell(s) is idle (S1550). If the channel is idle (YES in S1550), the UE checks whether the backoff counter value is 0 (S1530). On the contrary, if the channel is not idle in S1550, that is, if the channel is busy (NO in S1550), the UE checks whether the corresponding channel is idle for a defer duration $T_d$ (longer than or equal to 25 usec), which is longer than a slot duration (e.g., 9 usec), according to step 5 (S1560). If the channel is idle for the defer duration (YES in S1570), the UE may resume the CAP. Here, the defer duration may include a duration of 16 usec and $m_p$ consecutive slot durations (e.g., 9 usec), which immediately follows the duration of 16 usec. If the channel is busy for the defer duration (NO in S1570), the UE performs step S1560 again to check whether the channel is idle for a new defer duration.

Table 6 shows that the values of $m_p$, a minimum CW ($CW_{min,p}$), a maximum CW ($CW_{max,p}$), a maximum channel occupancy time (MCOT) ($T_{ulmcot,p}$), and allowed CW sizes, which are applied to the CAP, vary depending on channel access priority classes.

TABLE 6

| Channel Access Priority Class (p) | $m_p$ | $CW_{min,p}$ | $CW_{max,p}$ | $T_{ulmcot,p}$ | allowed CWp sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

The size of a CW (CWS) applied to the Type 1 UL CAP may be determined in various ways. For example, the CWS may be adjusted depending on whether the value of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with a channel access priority class p on a carrier, if the value of the NDI for the at least one HARQ process associated with HARQ_ID_ref is toggled, the UE may set $CW_p$ to $CW_{min,p}$ for every priority class $p \in \{1,2,3,4\}$. Otherwise, the UE may increase $CW_p$ for every priority class $p \in \{1,2,3,4\}$ to a next higher allowed value.

A reference subframe (or reference slot) $n_{ref}$ may be determined as follows.

When the UE receives a UL grant in a subframe (or slot) $n_g$ and performs transmission including a UL-SCH, which has no gaps and starts from a subframe (or slot) $n_0$ in subframes (or slots) $n_0, n_1, \ldots, n_w$, the reference subframe (or slot) $n_{ref}$ is the subframe $n_0$.

(2) Type 2 UL CAP Method

If the UE sense that a channel is idle at least for a sensing period $T_{short\_ul}$ of 25 us, the UE may perform UL transmission (e.g., PUSCH transmission) in the U-band immediately after completing the sensing. $T_{short\_ul}$ may be defined as follows: $T_{short\_ul} = T_{sl} (=9 \text{ us}) + T_f (=16 \text{ us})$.

According to the regional regulations for U-bands, when a communication node transmits a signal in the U-band, there may be a restriction that at least X % of the system bandwidth should be occupied and/or a power spectral density (PSD) restriction that limits transmit power available in each 1 MHz band to Y dBm. According to ETSI regulations, which are European regulations, X and Y may be set to 80 and 10, respectively (X=80 and Y=10). To minimize that the transmit power of the PUCCH or PUSCH is limited by the regulations, the UE may need to be capable of performing the PUCCH or PUSCH transmission based on a block-interleaved frequency division multiple access (B-IFDMA) structure. In the B-IFDMA structure, the whole band is divided into a plurality of interlaces. One cluster may include K consecutive REs (or RBs) in the frequency domain, and one interlace may include a plurality of clusters having an interval therebetween of L REs (or RBs). For example, assuming that there are 100 RBs in a system bandwidth of 20 MHz, the system bandwidth may be divided into 10 interlaces having a cluster size of one RB and a cluster interval of 10 RBs. In this case, cluster #n may be defined as {RB #(10*m+n)}, where n denotes a cluster index, and m denotes an interlace index in the cluster.

Hereinafter, the present disclosure describes PUCCH and PUSCH transmission methods in consideration of flexible OFDM numerologies, the B-IFDMA structure in the U-band, and the LBT operation in the NR system.

The terms used herein are defined as follows.

UCI: it refers to control information transmitted from the UE in UL. The UCI includes various types of control information (UCI types). For example, the UCI may include a HARQ-ACK (simply referred to as an A/N or AN), an SR, CSI, etc.

PUCCH: it refers to a physical layer UL channel for UCI transmission. Herein, PUCCH resources configured and/or indicated by the BS for transmission of an A/N, an SR, and CSI are referred to as an A/N PUCCH resource, an SR PUCCH resource, a CSI PUCCH resource, respectively.

PUSCH: it refers to a physical layer UL channel for UL data transmission.

Slot: it refers to a basic time unit (TU) (or time interval) for data scheduling. The slot includes a plurality of symbols. Here, the symbol may be an OFDM-based symbol (e.g., CP-OFDM symbol, DFT-s-OFDM symbol, etc.). In this document, a symbol is interchangeable with an OFDM-based symbol, OFDM symbol, CP-OFDM symbol, and/or DFT-s-OFDM symbol.

LBT type: it means the way how the LBT is performed (differentiated) in terms of channel sensing (CS). The LBT type is interchangeable with the CAP type. For example, LBT types may include the Type 1 CAP (see FIG. 11) and the Type 2 CAP described above. The Type 1 CAP (or CAP/LBT Type 1) means LBT where random back-off is performed based on a CW. Specifically, a transmitting node may perform the random back-off using the CW if the CS is successful. If it is sensed during the random back-off process that a channel is unoccupied, the transmitting node may transmit a signal. In this case, the size of the CW may be fixed or variable, and the LBT type may be further divided depending on the size of the CW. The Type 2 CAP (or CAP/LBT Type 2) means LBT where a transmitting node performs only CS with no random back-off. Specifically, if it is sensed that a channel is unoccupied for a predetermined period of time, the transmitting node may transmit a signal directly with no random back-off PUCCH formats may be classified as follows according to UCI payload sizes and/or transmission lengths (e.g., the number of symbols included in the PUCCH resource). Details of the PUCCH formats are found in Table 5 above.

(0) PUCCH Format 0 (PF0 or F0)

Supportable UCI payload size: up to K bits (e.g., K=2)

The number of OFDM symbols included in one PUCCH: 1 to X symbols (e.g., X=2)

Transmission structure: only a UCI signal is configured with no DM-RS, and a UCI state is transmitted by selecting and transmitting one of a plurality of sequences.

(1) PUCCH Format 1 (PF1 or F1)

Supportable UCI payload size: up to K bits (e.g., K=2)

The number of OFDM symbols included in one PUCCH: Y to Z symbols (e.g., Y=4 and Z=14)

Transmission structure: the UCI and DM-RS are configured in different OFDM symbols based on TDM. For the UCI, a specific sequence is multiplied by a modulation symbol (e.g., QPSK symbol). A cyclic shift/ orthogonal cover code (CS/OCC) is applied to both the UCI and DM-RS to support CDM between a plurality of PUCCH resources (complying with PUCCH format 1) (in the same RB).

(2) PUCCH Format 2 (PF2 or F2)

Supportable UCI payload size: more than K bits (e.g., K=2)

The number of OFDM symbols included in one PUCCH: 1 to X symbols (e.g., X=2)

Transmission structure: the DM-RS and UCI are configured/mapped in/to the same symbol based on FDM, and encoded UCI bits are transmitted by applying only an inverse fast Fourier transform (IFFT) thereto with no DFT.

(3) PUCCH Format 3 (PF3 or F3)

Supportable UCI payload size: more than K bits (e.g., K=2)

The number of OFDM symbols included in one PUCCH: Y to Z symbols (e.g., Y=4 and Z=14)

Transmission structure: the DM-RS and UCI are configured/mapped in/to different symbols based on TDM. Encoded UCI bits are transmitted by applying a DFT thereto. To support multiplexing between multiple UEs, the OCC is applied to the UCI, and the CS (or interleaved frequency division multiplexing (IFDM) mapping) is applied to the DM-RS before the DFT.

(4) PUCCH Format 4 (PF4 or F4)

Supportable UCI payload size: more than K bits (e.g., K=2)

The number of OFDM symbols included in one PUCCH: Y to Z symbols (e.g., Y=4 and Z=14)

Transmission structure: the DM-RS and UCI are configured/mapped in/to different symbols based on TDM. The DFT is applied to encoded UCI bits with no multiplexing between UEs.

A PUCCH resource may be determined for each UCI type (e.g., A/N, SR, CSI, etc.). The PUCCH resource used for UCI transmission may be determined based on the UCI (payload) size. For example, the BS may configure a plurality of PUCCH resource sets for the UE, and the UE may select a specific PUCCH resource set corresponding to a specific range according to the UCI (payload) size (e.g., the number of UCI bits). The UE may select one of the following PUCCH resource sets based on the number of UCI bits ($N_{UCI}$).

PUCCH resource set #0, if the number of UCI bits ≤2

PUCCH resource set #1, if 2<the number of UCI bits ≤$N_1$

. . .

PUCCH resource set #(K−1), if $N_{K-2}$<the number of UCI bits ≤$N_{K-1}$

Here, K denotes the number of PUCCH resource sets (K>1), and $N_i$ denotes a maximum number of UCI bits supported by PUCCH resource set #i. For example, PUCCH resource set #1 may include resources of PUCCH formats 0 and 1, and other PUCCH resource sets may include resources of PUCCH formats 2 to 4 (see Table 5).

When the UCI type corresponds to an SR and/or CSI, a PUCCH resource used for UCI transmission in a PUCCH resource set may be configured by higher layer signaling (e.g., RRC signaling). When the UCI type is the HARQ-ACK for a semi-persistent scheduling (SPS) PDSCH, a PUCCH resource used for UCI transmission in a PUCCH resource set may be configured by higher layer signaling (e.g., RRC signaling). On the other hand, when the UCI type is the HARQ-ACK for a normal PDSCH (i.e., PDSCH scheduled by DCI), a PUCCH resource used for UCI transmission in a PUCCH resource set may be scheduled by DCI.

Figure 12:
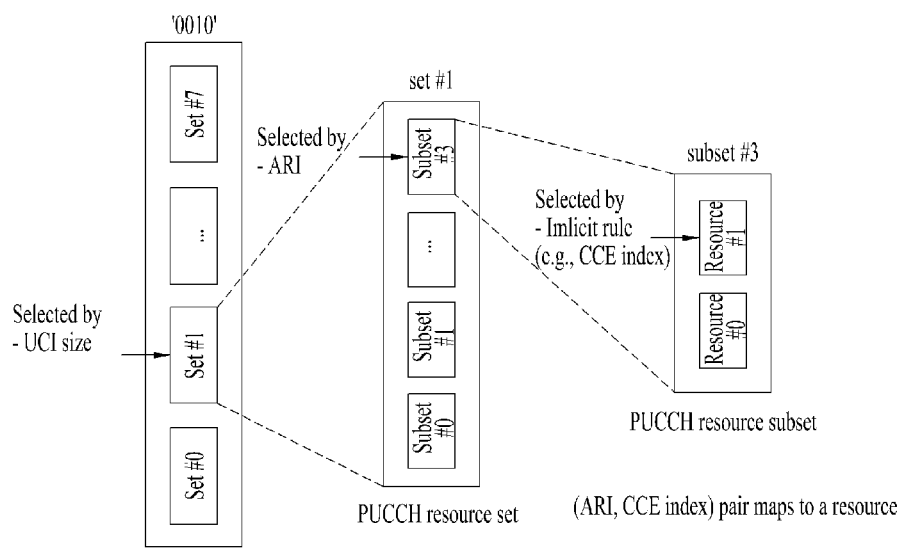
FIG. 12 illustrates a process for transmitting a physical uplink control channel (PUCCH).

Referring to FIG. 12, in the case of DCI-based PUCCH resource scheduling, the BS may transmit DCI over a PDCCH and indicate a specific PUCCH resource used for UCI transmission in a PUCCH resource set through an ACK/NACK resource indicator (ARI). The ARI may be used to indicate a PUCCH resource for ACK/NACK transmission and referred to as a PUCCH resource indicator (PRI). The DCI may be used for PDSCH scheduling, and the UCI may include the HARQ-ACK for a PDSCH. The BS may configure for the UE a PUCCH resource set including PUCCH resources more than the number of states that can be represented by the ARI through (UE-specific) higher layer signaling (e.g., RRC signaling). The ARI may indicate a PUCCH resource subset of a PUCCH resource set. Which PUCCH resource in the indicated PUCCH resource subset will be used may be determined according to an implicit rule based on transmission resource information about a PDCCH (e.g., the starting CCE index of the PDCCH, etc.).

Each of the proposed methods, which will be described hereinbelow, may be applied together with other proposed methods unless they collide with each other.

[Proposed Method #1]

In the U-band, the UE needs to perform the LBT operation before performing PUSCH (or PUCCH) transmission. Thus, if the UE attempts the transmission on only UL resource(s) scheduled by the BS, the UL transmission probability may be relatively low. To increase the UL transmission probability, it may be considered that a plurality of candidate transmission resources are supported for PUSCH (or PUCCH) transmission(s). For example, the BS may preconfigure a plurality of candidate transmission resources for the UE, and the UE may select one candidate transmission resource from among the plurality of candidate transmission resources based on its channel accessible time after performing the LBT operation. Then, the UE may transmit the PUSCH (or PUCCH) on the selected candidate transmission resource. In this case, the plurality of candidate transmission resources may be configured for each PUSCH (or PUCCH) resource. Alternatively, the plurality of candidate transmission resources may be configured with respect to a transmission starting symbol independently of PUSCH (or PUCCH) resources. In the latter case, a plurality of candidate transmission starting symbols may be configured for the plurality of candidate transmission resources and then applied to PUSCH or (PUCCH) transmission resources.

For example, the BS may configure the plurality of candidate transmission resources for the PUSCH (or PUCCH) transmission(s) according to at least one of the following options. The BS may inform the UE of the plurality of candidate transmission resources for the PUSCH (or PUCCH) transmission(s) through system information and/or a higher layer signal (e.g., RRC signal).

(1) Opt. 1: A plurality of candidate transmission resources may be configured for each PUSCH resource (or PUCCH resource (set)). In this case, the plurality of candidate transmission resources may be identified by transmission starting symbols, transmission lengths (e.g., the number of transmission symbols and/or the number of transmission slots), and/or LBT types. For example, when the BS configures PUSCH (or PUCCH) resource #A for the UE in DCI, a plurality of candidate resources for PUSCH (or PUCCH) resource #A, i.e., PUSCH (or PUCCH) resources #$A_1$, #$A_2$, . . . , #$A_n$ may be configured. In this case, the UE may perform the LBT procedure for PUSCH (or PUCCH) resources #$A_1$, #$A_2$, . . . , #$A_n$. Specifically, when subband #A of slot #S is indicated as the PUSCH (or PUCCH)

resource, the plurality of candidate transmission resources may be configured as follows:

Subbands #(A+a)/#(A+2*a)/ . . . /#(A+n*a) of slot #S
Subbands #A of slots #S/#S+1/ . . . /#S+n (2) Opt. 2: A plurality of candidate transmission starting symbols (or transmission starting symbol offsets) may be configured. In this case, the same PUSCH resource (or PUCCH resource (set)) may be configured for each candidate transmission starting symbol (or transmission starting symbol offset). Alternatively, the PUSCH resource (or PUCCH resource (set)) may be configured independently for each candidate transmission starting symbol (or transmission starting symbol offset).

Then, the UE may select one of the plurality of candidate transmission resources based on the LBT operation and then perform the PUSCH (or PUCCH) transmission. Specifically, the UE may perform the LBT procedure for the plurality of candidate transmission resources, select one of the candidate transmission resources where the LBT is successful, and then perform the PUSCH (or PUCCH) transmission. If the LBT is unsuccessful for all of the plurality of candidate transmission resources, the UE may skip/drop the PUSCH (or PUCCH) transmission.

The BS may provide information about whether one transmission resource or a plurality of candidate transmission resources are allowed for the PUSCH (or PUCCH) transmission in a higher layer signal (e.g., RRC signal) and/or DCI.

[Proposed Method #2]

Considering that the UE needs to perform the LBT operation before performing PUSCH (or PUCCH) transmission in the U-band, the LBT type for the PUSCH (or PUCCH) transmission also needs to be configured.

In this method, the LBT type may be configured for each PUSCH resource (or PUCCH resource (set)). Alternatively, the LBT type may be indicated independently of the PUSCH resource (or PUCCH resource (set)). In the latter case, the UE may interpret the indication of the PUSCH resource (or PUCCH resource (set)) in different ways depending on the LBT type. The configuration of the PUSCH resource (or PUCCH resource (set)) may differ for each LBT type.

For example, the BS may indicate the LBT type for PUSCH (or PUCCH) transmission(s) according to at least one of the following options.

(1) Opt. 1: The LBT type may be indicated in relation to the PUSCH resource (or PUCCH resource (set)). For example, the BS may (independently) configure the LBT type for each PUSCH resource (or PUCCH resource (set)) through system information and/or a higher layer signal (e.g., RRC signal). For the PUSCH, the LBT type may be configured for each interlace. In this case, the LBT type may be checked based on the first interlace (or RB) among a plurality of interlaces (or RBs) allocated for PUSCH transmission. For the PUCCH, the LBT type may be configured as follows.

When the LBT type is configured for each PUCCH resource

TABLE 7

| PRI (3bits) | PUCCH resource | LBT type |
|---|---|---|
| 000 | 1$^{st}$ PUCCH resource configured by a higher layer | a |

TABLE 7-continued

| PRI (3bits) | PUCCH resource | LBT type |
|---|---|---|
| 001 | 2$^{nd}$ PUCCH resource configured by a higher layer | b |
| . . . | . . . | . . . |
| 111 | 8$^{th}$ PUCCH resource configured by a higher layer | a |

When the LBT type is configured for each PUCCH resource set
PUCCH resource set #0, then LBT type #a
PUCCH resource set #1, then LBT type #b
. . .
PUCCH resource set #(K−1), then LBT type #a (2) Opt. 2: The LBT type may be indicated independently of the PUSCH resource (or PUCCH resource (set)). For example, the BS may indicate the LBT type for PUCCH transmission in DL scheduling DCI (e.g., DL assignment). As another example, the UE may interpret the indication of the PUSCH resource (or PUCCH resource (set)) in different ways based on the LBT type indicated by the BS. That is, the configuration of the PUSCH resource (or PUCCH resource (set)) may differ for each LBT type. In the case of the PUSCH, the interlace (or RB) used for PUSCH transmission may be interpreted differently depending on the LBT type. For example, when the number of interlaces (or RBs) is 10, resource allocation information in a UL grant may indicate a value from 1 to 5. In this case, depending on the value indicated by LBT type information in the UL grant, the numbers from 1 to 5 indicated by the resource allocation information may correspond to {1, 3, 5, 7, 9} or {2, 4, 6, 8, 10} depending on the value indicated by LBT type information in the UL grant. In the case of the PUCCH, the LBT type may be configured as follows.

When the LBT type is configured for each PUCCH resource

TABLE 8

| PRI (3bits) | LBT type #a | LBT type #b |
|---|---|---|
| 000 | 1_1$^{st}$ PUCCH resource configured by a higher layer | 1_2$^{st}$ PUCCH resource configured by a higher layer |
| 001 | 2_1$^{nd}$ PUCCH resource configured by a higher layer | 2_2$^{nd}$ PUCCH resource configured by a higher layer |
| . . . | . . . | . . . |
| 111 | 8_1$^{th}$ PUCCH resource configured by a higher layer | 8_2$^{th}$ PUCCH resource configured by a higher layer |

When the LBT type is configured for each PUCCH resource set
PUCCH resource set #0_1, if the number of UCI bits ≤2 and LBT type #a
PUCCH resource set #1_1, if 2<the number of UCI bits ≤N$_1$ and LBT type #a
. . .
PUCCH resource set #(K−1)_1, if N$_{K−2}$<the number of UCI bits ≤N$_{K−1}$ and LBT type #a
PUCCH resource set #0_2, if the number of UCI bits ≤2 and LBT type #b
PUCCH resource set #1_2, if 2<the number of UCI bits ≤N$_1$ and LBT type #b
. . .
PUCCH resource set #(K−1)_2, if N$_{K−2}$<the number of UCI bits ≤N$_{K−1}$ and LBT type #b Thereafter, the UE may perform the LBT procedure based on the LBT type and then perform the PUSCH (or PUCCH) transmission on a PUSCH resource (or PUCCH resource) where the LBT is successful. If the LBT is unsuccessful, the UE may skip/drop HARQ-ACK transmission.

Figure 13:
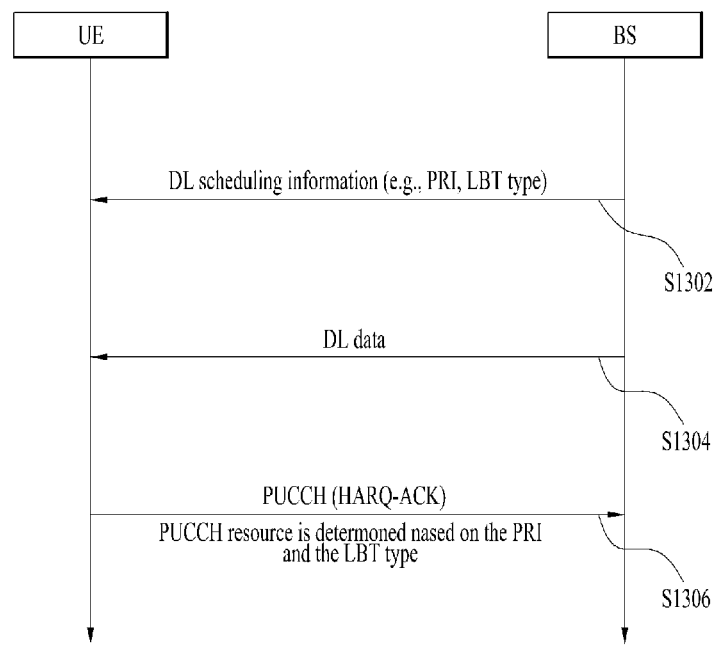
FIGS. 13 and 14 illustrates signal transmission and resource allocation according to the present disclosure.

FIG. 13 illustrates a control information transmission process according to the present disclosure. Specifically, FIG. 13 shows a case in which a HARQ-ACK is transmitted over a PUCCH.

Referring to FIG. 13, a UE may receive DL scheduling information from a BS (S1302). For example, the DL scheduling information may be included in DCI format 1_0/1_1 and received on a PDCCH. The DL scheduling information may include LBT type information and PRI information. The UE may receive DL data from the BS based on the DL scheduling information (S1304). Then, the UE may perform a process for transmitting HARQ-ACK information for the DL data. Specifically, the UE may perform the LBT procedure based on the indicated LBT type. The UE may transmit the HARQ-ACK information over a PUCCH if the LBT is successful (S1306). If the LBT is unsuccessful, the UE may skip/drop the HARQ-ACK transmission. In this case, a PUCCH resource used for the HARQ-ACK transmission (HARQ-ACK PUCCH resource) may be determined based on the LBT type and PRI. The HARQ-ACK may be transmitted in the UCell/U-band. Further, the LBT may be interchangeable with the CAP.

Specifically, one PUCCH resource set may be determined from among a plurality of PUCCH resource sets based on the LBT type. The plurality of PUCCH resource sets may be configured by a higher layer signal. Each PUCCH resource set may correspond to each LBT type and include a plurality of PUCCCH resources. Thereafter, one PUCCH resource in the determined PUCCH resource set may be determined as the HARQ-ACK PUCCH resource based on the PRI.

For example, if the value of the LBT type information indicates a first LBT type, the PRI may indicate that the HARQ-ACK PUCCH resource is in a first PUCCH resource set. If the value of the LBT type information indicates a second LBT type, the PRI may indicate that the HARQ-ACK PUCCH resource is in a second PUCCH resource set. Here, the first PUCCH resource set may be different from the second PUCCH resource set. The first LBT type may be an LBT type where no back-off is performed, and the second LBT type may be an LBT type where back-off is performed.

Figure 14:
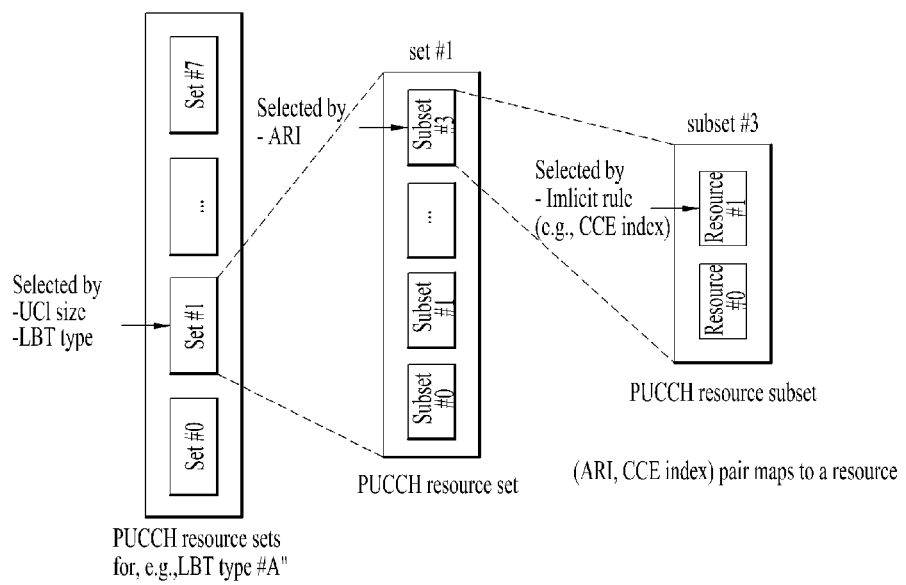

FIG. 14 illustrates a method of determining a PUCCH resource according to the present disclosure. FIG. 14 is applicable when the PUCCH resource is determined in FIG. 13.

Referring to FIG. 14, a BS may transmit DCI to a UE over a PDCCH. More particularly, the BS may indicate a specific PUCCH resource used for UCI transmission in a PUCCH resource set through a PRI and an LBT type in the DCI. The DCI may be DCI used for PDSCH scheduling (e.g., DCI format 1_0/1_1), and the UCI may include an HARQ-ACK for the PDSCH. Specifically, the BS may configure for the UE a plurality of PUCCH resource sets for LBT types, and the UE may select a specific PUCCH resource set based on the UCI (payload) size (e.g., the number of UCI bits) and/or LBT type. The UCI may be transmitted on a PUCCH resource in the specific PUCCH resource set, and the PUCCH resource is indicated by the PRI. The BS may configure for the UE a PUCCH resource set including PUCCCH resources more than the number of states that can be represented by the PRI through a (UE-specific) higher layer signal (e.g., RRC signal). In this case, the PRI may indicate a PUCCH resource sub-set in the PUCCH resource set. Which PUCCH resource in the indicated PUCCH resource subset will be used may be determined according to an implicit rule based on transmission resource information about the PDCCH (e.g., the starting CCE index of the PDCCH, etc.).

[Proposed Method #3]

In the NR system (in particular, in the NR L-band system), a periodic SR resource may be configured and then reserved as a UL resource for SR transmission. However, this method may not be suitable for U-band systems that require dynamic TDD due to the LBT.

Accordingly, the present disclosure proposes to configure a periodic time window (SR window) for SR transmission in the U-band. The SR window may include one or more, and more preferably, a plurality of consecutive slots. In this case, only when a PUCCH resource for HARQ-ACK transmission (HARQ-ACK PUCCH resource) exists within the SR window, the UE may multiplex an HARQ-ACK and an SR and transmit the multiplexed HARQ-ACK and SR on the PUCCH resource. The SR window may not be used only for the SR. In other words, when the UE intends to report only the SR with no HARQ-ACK, the UE may not be allowed to transmit the SR in the SR window. Instead, the UE may report the SR (SR only information) on a RACH occasion in the form of a RACH preamble.

For example, the BS may configure a (periodic) time window (i.e., SR window) for (periodic) SR transmission, and the UE may perform the SR transmission within the SR window as follows.

(1) When HARQ-ACK Transmission is Present within the SR Window:

The HARQ-ACK and SR may be multiplexed and transmitted on a PUCCH resource. The PUCCH resource may be a PUCCH resource allocated for HARQ-ACK transmission (HARQ-ACK PUCCH resource) (see FIG. 12) and/or a PUCCH resource allocated for UCI where the HARQ-ACK and SR are multiplexed (such a PUCCH resource is referred to as a MUX PUCCH resource). The MUX PUCCH resource may include a PUCCH resource allocated for SR transmission (SR PUCCH resource).

When one interlace resource is defined as a plurality of clusters in the frequency domain, each of which having a constant cluster size and cluster interval, PRB(s) on a plurality of interlace resource(s) are assigned as a PUSCH (or PUCCH) transmission resource, the HARQ-ACK and SR may be separately encoded and then transmitted on different interlace resource(s).

When the HARQ-ACK and SR are transmitted on a single PUCCH resource, multiplexing of the HARQ-ACK and SR may vary depending on HARQ-ACK PUCCH resource formats. For example, in the case of HARQ-ACK PUCCH resource format 0, the HARQ-ACK and SR may be multiplexed by changing a sequence transmitted on PUCCH format 0. In the case of HARQ-ACK PUCCH resource format 1, the HARQ-ACK may be transmitted on the MUX PUCCH resource (e.g., SR PUCCH resource) if the SR is a positive SR. The HARQ-ACK may be transmitted on the HARQ-ACK PUCCH resource if the SR is a negative SR. In the case of HARQ-ACK PUCCH resource formats 2 to 4, HARQ-ACK bit(s) and SR bit(s) may be transmitted on the HARQ-ACK PUCCH resource.

(2) When No HARQ-ACK Transmission is Present within the SR Window:

No SR transmission may be performed (e.g., SR transmission may be dropped).

Meanwhile, a plurality of SR windows may be configured, and one or more SR windows may overlap in a specific time period. In this case, if HARQ-ACK transmission is present in the specific time period, the UE may (multiplex and) report the HARQ-ACK and (a plurality of pieces of different) SR information. If there is no HARQ-ACK transmission in the specific time period, the UE may perform no SR transmission (e.g., drop the SR transmission). In other words, when the plurality of SR windows are configured, the proposed method may be applied as follows: a plurality of pieces of SR information is multiplexed and reported in an intersection of the SR windows.

[Proposed Method #4]

When PUCCH formats of the NR system (e.g., PUCCH format 0/1/2/3/4) are extended suitable for the U-band, one PUDCCH resource may need to be configured at least in the form of an interlace resource (or multi-cluster resource) in the frequency domain. In this case, if a sequence-based PUCCH such as PUCCH format 0/1 is configured as the interlace resource, it may be inefficient in that the payload size of transmitted UCI is extremely small (one or two bits) but the amount of occupied frequency-domain resources is relatively large. In the U-band system, since HARQ-ACK information needs to be multiplexed on a single PUCCH resource as much as possible due to the necessity for the dynamic TDD, PUCCH format 0/1 for small UCI payload may be further unnecessary. Thus, in the U-band, a PUCCH format transmitted by the UE after encoding of UCI payload (e.g., PUCCH format 2/3/4) may be introduced without the sequence-based PUCCH format such as PUCCH format 0/1. In this case, an (initial or default) PUCCH resource used for HARQ-ACK reporting before the UE is configured with an RRC configuration or UE-specific (dedicated) PUCCH resource may comply with the UCI-encoding-based PUCCH format. Since it is expected that the size of HACK-ACK information is extremely small, it may be considered that the UE uses the remaining resources of the PUCCH format to report additional information. The additional information may include CSI for assisting fast link adaptation of the UE, information including radio resource management (RRM) measurement, or a buffer state report (BSR) for fast UL resource allocation. Further, the additional information may include LBT-related information such as the probability that the LBT (or CCA) is successful for a current channel.

For example, when the BS uses the PUCCH format where UCI payload is encoded as the (initial) PUCCH resource for HARQ-ACK transmission before configuring the UE-specific PUCCH resource, it may be considered that the UE transmits at least one of the following additional information on the PUCCH resource in addition to the HARQ-ACK.

(1) Opt. 1: BSR (e.g., UL traffic information)
(2) Opt. 2: CSI
(3) Opt. 3: Link quality information (e.g., RRM measurement)
(4) Opt. 4: LBT-related information (e.g., information about busy/idle rate in channel)

[Proposed Method #5]

When a PUSCH (or PUCCH) is transmitted, one of a plurality of candidate transmission starting symbols may be applied. In this case, the plurality of candidate transmission starting symbols may be configured/applied differently depending on the relative locations of a (initially scheduled) PUSCH transmission starting symbol and a (first) DM-RS symbol.

For example, in NR, the DM-RS symbol in the PUSCH may be transmitted at the location of symbol index 2 or 3 (i.e., symbol 2 or 3) with respect to a slot (PUSCH mapping type A). In this case, if the transmission starting symbol of the PUSCH is before the first DM-RS symbol (i.e., symbol 0 to 1 or symbol 0 to 2), a plurality of candidate transmission starting symbols may be configured before the first DM-RS symbol. Otherwise (when the transmission starting symbol of the PUSCH is the first DM-RS symbol), one candidate transmission starting symbol may be configured before the first DM-RS symbol.

For example, in the former case (when the plurality of candidate transmission starting symbols are configured), the UE may start the PUSCH transmission after attempting the LBT for the following four positions.

(1) Position 1: before 25 us from symbol 0
(2) Position 2: after 25 us from symbol 0
(3) Position 3: after {25 us+timing advance (TA)} from symbol 0
(4) Position 4: before 25 us from symbol 1

In the latter case (when the one candidate transmission starting symbol is configured), the UE may start the PUSCH transmission only before 25 us from the DM-RS symbol.

Alternatively, the DM-RS symbol in the PUSCH may be transmitted at the location of the first symbol with respect to a PUSCH transmission resource (PUSCH mapping type B). In this case, it may be considered that the UE starts the PUSCH transmission only before 25 us from the DM-RS symbol after performing the LBT. In addition, an additional DM-RS may be configured after the first DM-RS (unit) (consisting of one or two symbols) in the PUSCH. In this case, a plurality of candidate transmission starting symbols may be configured between the first DM-RS (unit) and second DM-RS (unit).

When the PUSCH is transmitted, whether a partial TTI is capable of being transmitted may depend on whether the additional DM-RS is configured. For example, the BS may configure for the UE whether the partial TTI is allowed through a higher layer signal (e.g., RRC signal). If there is no additional DM-RS, it may be allowed that the UE performs or drop the entirety of the PUSCH transmission depending on LBT results. On the contrary, when the additional DM-RS is present, the UE may perform the (prolonged) PUSCH transmission in a plurality of candidate transmission starting symbol(s). In this case, the UE may skip transmission only in some symbol groups including the first DM-RS in spite of failure in the first transmission starting symbol, and then perform the LBT for the (shortened) PUSCH transmission in some symbol groups including the second DM-RS.

The various descriptions, functions, procedures, proposals, methods, and/or operational flowcharts proposals of the present disclosure described above in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
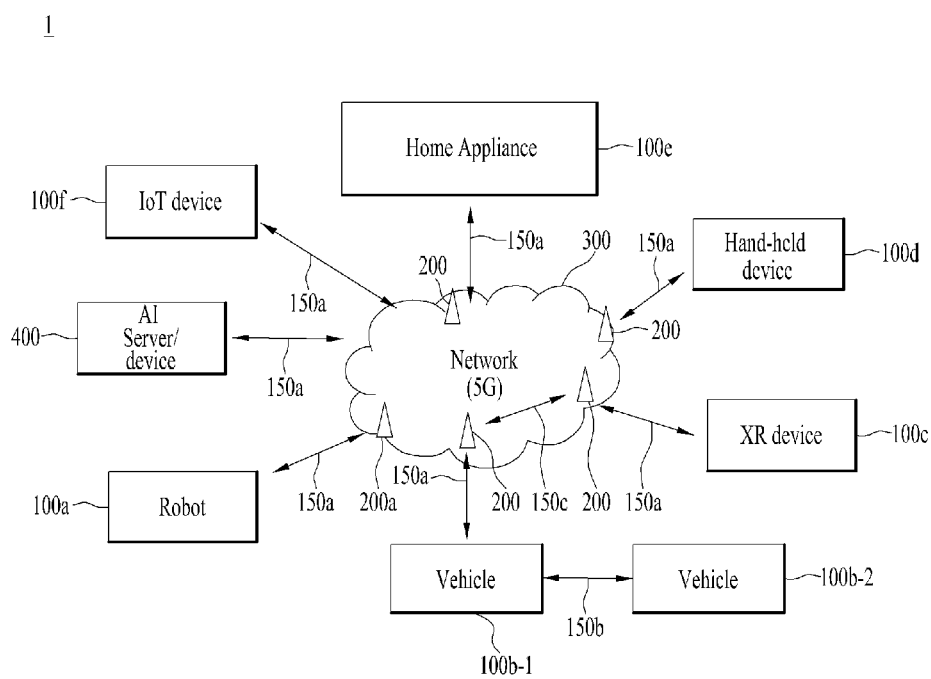
FIGS. 15 to 18 illustrate communication systems and wireless devices applicable to the present disclosure.

FIG. 15 illustrates a communication system 1 applied to the present disclosure.

Referring to FIG. 15, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
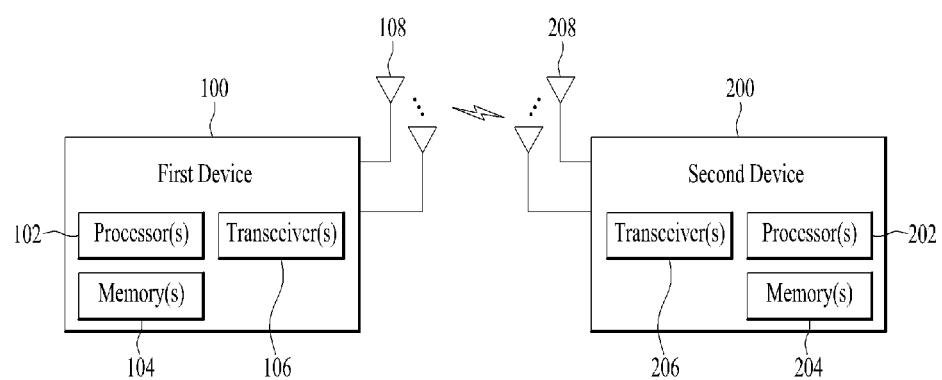

FIG. 16 illustrates wireless devices applicable to the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
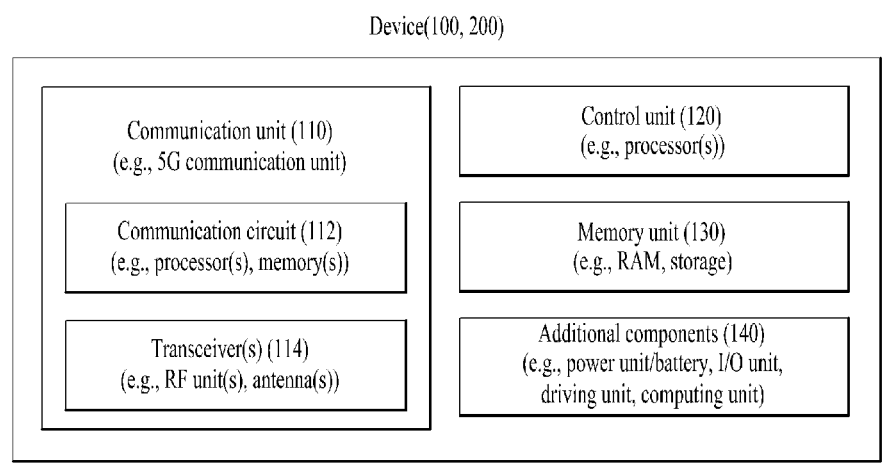

FIG. 17 illustrates another example of a wireless device applied to the present disclosure. The wireless device may be implemented in various forms according to a use-case/service (refer to FIG. 15).

Referring to FIG. 17, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM), a flash memory, a volatile memory, a non-volatile memory, and/or a combination thereof.

Figure 18:
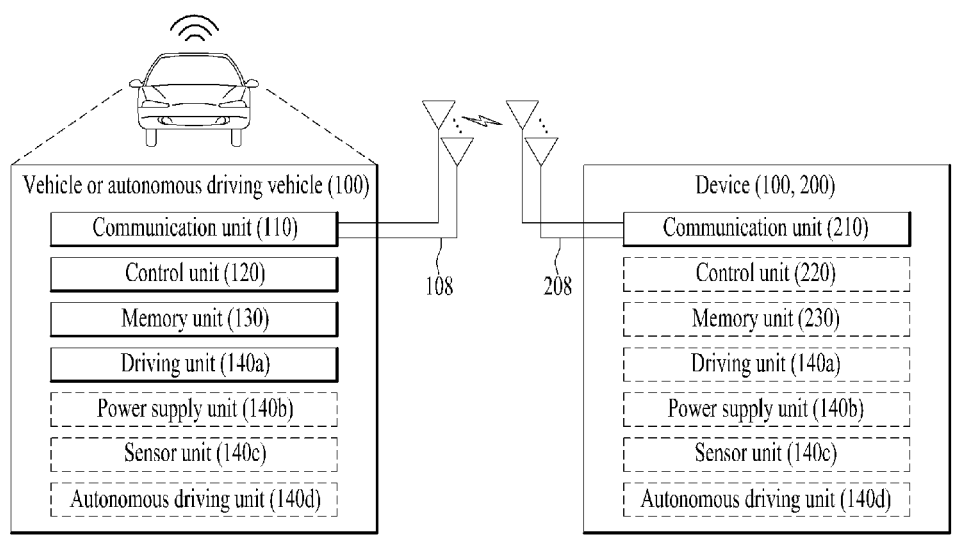

FIG. 18 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 18, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 17, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, eNBs or other apparatuses of a wireless mobile communication system.

The invention claimed is:

1. A method of transmitting a signal by a communication device in a wireless communication system, the method comprising:
receiving scheduling information including listen-before-talk (LBT) type information and physical uplink control channel (PUCCH) resource indication information;
receiving data based on the scheduling information; and
transmitting acknowledgement/negative-acknowledgement (ACK/NACK) information for the data on a PUCCH resource after performing an LBT procedure based on the LBT type information,
wherein one PUCCH resource set is selected from among a plurality of PUCCH resource sets based on a value of the LBT type information, and
wherein the PUCCH resource is indicated by the PUCCH resource indication information within the selected PUCCH resource set.

2. The method of claim 1, wherein the plurality of PUCCH resource sets are configured by a higher layer signal, and wherein each PUCCH resource set is related to each LBT type and includes a plurality of PUCCH resources.

3. The method of claim 1, wherein based on the value of the LBT type information indicating a first LBT type, the PUCCH resource is indicated by the PUCCH resource indication information within a first PUCCH resource set,
wherein based on the value of the LBT type information indicating a second LBT type, the PUCCH resource is indicated by the PUCCH resource indication information within a second PUCCH resource set, and
wherein the first PUCCH resource set is different from the second PUCCH resource set.

4. The method of claim 3, wherein the first LBT type is an LBT type in which back-off is not performed, and wherein the second LBT type is an LBT type in which the back-off is performed.

5. The method of claim 1, wherein the ACK/NACK information is transmitted on an unlicensed cell (UCell).

6. The method of claim 1, wherein the LBT procedure comprises a channel access procedure (CAP).

7. The method of claim 1, wherein the wireless communication system comprises a 3rd Generation Partnership Project-based (3GPP-based) wireless communication system.

8. A communication device for use in a wireless communication system, the communication device comprising:
a memory; and
a processor, the processor is configured to:
receive scheduling information including listen-before-talk (LBT) type information and physical uplink control channel (PUCCH) resource indication information;
receive data based on the scheduling information; and
transmit acknowledgement/negative-acknowledgement (ACK/NACK) information for the data on a PUCCH resource after performing an LBT procedure based on the LBT type information,
wherein one PUCCH resource set is selected from among a plurality of PUCCH resource sets based on a value of the LBT type information, and
wherein the PUCCH resource is indicated by the PUCCH resource indication information within the selected PUCCH resource set.

9. The communication device of claim 8, wherein the plurality of PUCCH resource sets are configured by a higher layer signal, and wherein each PUCCH resource set is related to each LBT type and includes a plurality of PUCCH resources.

10. The communication device of claim 8, wherein based on the value of the LBT type information indicating a first LBT type, the PUCCH resource is indicated by the PUCCH resource indication information within a first PUCCH resource set,
wherein based on the value of the LBT type information indicating a second LBT type, the PUCCH resource is indicated by the PUCCH resource indication information within a second PUCCH resource set, and
wherein the first PUCCH resource set is different from the second PUCCH resource set.

11. The communication device of claim 10, wherein the first LBT type is an LBT type in which back-off is not performed, and wherein the second LBT type is an LBT type in which the back-off is performed.

12. The communication device of claim 8, wherein the ACK/NACK information is transmitted on an unlicensed cell (UCell).

13. The communication device of claim 8, wherein the LBT procedure comprises a channel access procedure (CAP).

14. The communication device of claim 8, wherein the wireless communication system comprises a 3rd Generation Partnership Project-based (3GPP-based) wireless communication system.

15. The communication device of claim 8, wherein the communication device comprises an autonomous driving vehicle configured to communicate at least with a terminal, a network, and other autonomous driving vehicles other than the communication device.

* * * * *